2,793,985

COPPER SWEETENING TREATING AGENT COMPRISING AN ADSORBENT ADMIXED WITH A POLYMERIC POLYELECTROLYTE AND A COPPER SALT, AND METHOD FOR COPPER SWEETENING

William H. Dennis, Jr., Old Ocean, Tex., assignor to Phillips Petroleum Company, a corporation of Delaware No Drawing. Application February 18, 1955, Serial No. 489,269

4 Claims. (Cl. 196—29)

This invention relates to copper sweetening. In one of its aspects the invention relates to a method of treating a hydrocarbon employing copper compound containing treating clay containing an anionic polyelectrolyte. In another of its aspects the invention relates to an improved treating clay comprising an anionic polyelectrolyte.

Among the objects of the invention is the provision of a method of copper sweetening in which packing of a copper compound containing treating clay is prevented. Also among the objects of the invention is the provision of an improved copper compound containing treating clay or similar material.

In the operation of copper compound containing treating beds, for example, in the treatment of hydrocarbon fluids, there can occur from time to time a pick-up of moisture which causes the bed of copper compound containing treating material or clay to become compacted. When compacting occurs, pressure drop across the treating tower will increase, channelling can then occur, and therefore, the operation does not proceed in a desired fashion.

I have now found that the incorporation of a polyelectrolyte such as a water-soluble polyelectrolyte of the type of maleic anhydride acrylonitrile copolymer into the clay of which the bed is largely composed will prevent compacting or packing of the bed.

Therefore, according to this invention, there is provided a method of treating a hydrocarbon with a copper compound containing treating bed which comprises incorporating into the treating bed clay or other matter which tends to compact due to moisture a polyelectrolyte having the property of preventing compacting of the said bed material due to accumulation of moisture.

Also according to this invention, there is provided a treating bed which is characterized by compacting thereof due to accumulation of moisture, said bed having distributed throughout its mass a small percentage of a polyelectrolyte adapted to prevent said bed from compacting upon accumulation of moisture therein.

In Patent 2,094,485, granted September 28, 1937, there are described and claimed processes for sweetening mercaptan-bearing petroleum oil which comprise contacting the said oil in admixture with air with an adsorbent material impregnated with a maintained aqueous solution phase containing cupric ions and chloride ions. The treating agent which is employed is a solid treating agent comprising a highly porous or adsorbent material such as fuller's earth, charcoal and the like, impregnated with a concentrated solution of cupric chloride. Such an agent is a material excellent for rapidly and efficiently sweetening "sour" hydrocarbon oils. Generally, in the said patent the reactions are given and the process further detailed and described. It is to this type of process that the present invention is particularly applicable. However, in view of its character, it will be obvious to those skilled in the art in possession of this disclosure, that the invention is applicable to similar treating beds which have the characteristic of compacting due to accumulation of moisture. Therefore, it is within the scope of the appended claims to treat, with such a bed, a hydrocarbon oil although the treatment may not have for its purpose, necessarily, the removal of mercaptan from the hydrocarbon. Also, it is not necessary that the bed contain a copper sweetening reagent. Thus the bed may contain some other reagent or the bed material itself may be the reagent.

The following example is representative of an application of the invention to a copper sweetening process.

Example

A very sour west Texas gasoline, containing about 0.05% mercaptan sulfur, is treated by adding air and then passing it thru a bed of about 2,000 pounds of sweetening reagent at a flow rate of about 15,000 gallons per day. At approximately 100 day intervals accumulated water is removed from the reagent by taking the reagent out of the treating vessel and exposing it to the atmosphere until the water content is reduced to the original value. Meanwhile, a second treater is used to sweeten the gasoline. This reserve treater contains only 185 pounds of sweetening reagent, but can be operated at the 15,000 gallon flow rate for 30 day periods, if desired, before it accumulates sufficient excess water to prevent sweetening. The reagent was originally prepared by spraying 15–30 mesh fuller's earth, admixed with about one-tenth of one percent of Krilium "T" (a commercial polyelectrolyte), with solution containing copper chloride prepared from copper sulfate and an excess of sodium chloride, to produce a reagent comprising about 75 parts by weight fuller's earth, and about 25 parts solution containing about 14% copper and 20% chloride ions.

Polyelectrolytes which are suited to the practice of the present invention are available commercially and are known in the trade, as indicated, as "Kriliums." They are also known in the trade by other names. The polyelectrolytes, per se, do not form a part of the present invention. The polyelectrolytes which are employed according to the present invention are known commercially as "soil-conditioners." Soil-conditioners are described in Patent 2,625,471 of January 13, 1953, which are the solid synthetic polymeric water-soluble polyelectrolytes having a weight average molecular weight of at least 10,000, and a structure derived by the substantially linear polymerization of at least one monoolefinic compound through the aliphatic unsaturated group. The invention is not limited to the use of the soil-conditioners described in the said patent.

According to the invention the percentage of the polyelectrolyte admixed with the treating material bed is not limited to less than one percent. However, a quantity of less than one percent is now preferred. It is within the scope of the invention to employ up to 5 percent or more of the conditioning agent.

Reasonable variation and modification are possible within the scope of the foregoing disclosure and the appended claims to the invention, the essence of which is that a polyelectrolyte which is suitable for the adsorption of moisture is admixed with a treating bed employed for the treating of hydrocarbons, as described, to prevent compacting of said bed.

I claim:

1. A process for sweetening mercaptan-bearing hydrocarbon oil, comprising contacting said oil, in admixture with a gas containing free oxygen, with an adsorbent material having admixed therewith a small percentage of an anionic polymeric polyelectrolyte adapted to prevent compacting of the said adsorbent material due to accumulation of moisture therein, said polyelectrolyte being a solid synthetic polymeric water-soluble polyelectrolyte having a weight average molecular weight of at least 10,000, and a structure derived by the substantially linear polymerization of at least one monoolefinic compound through the aliphatic unsaturated group, the said adsorbent material being impregnated with an aqueous solution base containing cupric ions and chloride ions.

2. A copper sweetening treating agent comprising a highly porous adsorbent material admixed with approximately 0.1–5 percent of a polymeric polyelectrolyte adapted to prevent compacting of said adsorbent material due to accumulation of moisture therein, said polyelectrolyte being a solid synthetic polymeric water-soluble polyelectrolyte having a weight average molecular weight of at least 10,000, and a structure derived by the substantially linear polymerization of at least one monoolefinic compound through the aliphatic unsaturated group, said adsorbent material being impregnated with a concentrated aqueous solution of cupric chloride.

3. A process according to claim 1 wherein said polyelectrolyte is a maleic anhydride acrylonitrile copolymer.

4. A copper sweetening treating agent according to claim 2 wherein the said polyelectrolyte is a maleic anhydride acrylonitrile copolymer.

References Cited in the file of this patent

UNITED STATES PATENTS

| | | |
|---|---|---|
| 2,042,050 | Hoover | May 26, 1936 |
| 2,401,348 | Hauser et al. | June 4, 1946 |
| 2,552,775 | Fisher et al. | May 15, 1951 |
| 2,625,529 | Hedrick et al. | Jan. 13, 1953 |